United States Patent
Yoshida et al.

(10) Patent No.: US 6,481,720 B1
(45) Date of Patent: Nov. 19, 2002

(54) STERN TUBE SEALING APPARATUS

(75) Inventors: Hisashi Yoshida, Toyama (JP); Minoru Takayasu, Toyama (JP)

(73) Assignee: Japan Marine Technologies Ltd., Tokyo (JP)

( * ) Notice: Subject to any disclaimer, the term of this patent is extended or adjusted under 35 U.S.C. 154(b) by 98 days.

(21) Appl. No.: 09/642,105

(22) Filed: Aug. 21, 2000

(51) Int. Cl.$^7$ .................................. F16J 15/32
(52) U.S. Cl. ..................... 277/400; 277/408; 277/559; 277/563; 277/927; 440/112
(58) Field of Search ............... 277/400, 408, 277/559, 562, 563, 431, 432, 512–4, 926, 927; 440/112

(56) References Cited

U.S. PATENT DOCUMENTS

| | | | |
|---|---|---|---|
| 3,625,523 A | * | 12/1971 | Gardner et al. |
| 3,854,732 A | * | 12/1974 | Franz et al. |
| 3,894,741 A | * | 7/1975 | McHugh |
| 3,913,925 A | * | 10/1975 | Gyory |
| 3,934,952 A | | 1/1976 | Gardner |
| 4,344,631 A | * | 8/1982 | Winn |
| 4,375,303 A | * | 3/1983 | Tamamori |
| 4,395,141 A | * | 7/1983 | Pietsch et al. |
| 4,448,425 A | | 5/1984 | von Bergen |
| 4,482,159 A | | 11/1984 | Ishitani et al. |
| 4,534,569 A | | 8/1985 | Ishitani et al. |
| 4,632,403 A | | 12/1986 | Ishitani et al. |
| 4,984,811 A | | 1/1991 | Kuwabara et al. |
| 5,137,116 A | * | 8/1992 | Von Bergen et al. |
| 5,643,026 A | * | 7/1997 | Pietsch et al. |
| 5,683,278 A | * | 11/1997 | Pietsch et al. |
| 5,727,095 A | * | 3/1998 | Hoeting |

FOREIGN PATENT DOCUMENTS

| | | | |
|---|---|---|---|
| DE | 38 17 660 A | | 12/1989 |
| DE | 39 24 270 A | | 1/1991 |
| DE | 42 28 005 A | | 4/1993 |
| DE | 2 205 365 A | | 12/1998 |
| EP | 0335368 B1 | | 10/1989 |
| GB | 2150234 | * | 6/1985 |
| JP | 5-147587 | * | 6/1993 |
| JP | 0603454 | | 2/1994 |
| JP | 06323439 | | 11/1994 |
| JP | 06323443 | | 11/1994 |
| JP | 07010084 | | 1/1995 |
| JP | 10331985 | | 12/1998 |
| JP | 2000-238694 | * | 9/2000 |

* cited by examiner

Primary Examiner—Anthony Knight
Assistant Examiner—Alison K. Pickard
(74) Attorney, Agent, or Firm—Arent Fox Kintner Plotkin Kahn

(57) ABSTRACT

The invention provides a stern tube sealing apparatus which prevents an abrasion by cooling and lubricating a sliding contact surface of a first seal ring, prevents a foreign substance and a seawater from entering so as to further improve a durability of a seal ring and a liner, intends to make the sealing apparatus compact and reduce a cost by using no pressurizing apparatus, and has a high reliability of a seal system. In order to achieve the stern tube sealing apparatus, the structure is made such that the stern tube sealing apparatus is constituted by a plurality of seal rings slidably brought into contact with a liner of a propeller shaft, piping communicating with one of a liquid reservoir tank arranged so that a liquid pressure within the stern annular space is lower than a draft pressure on shaft center line is provided in a stern annular space defined by a first seal ring arranged on a stern side and a second seal ring adjacent to the first seal ring, and a feeding device for forcibly feeding the liquid in the stern annular space to the outside of a vessel having a higher pressure at a time of shaft rotation is provided on a sliding contact surface of the first seal ring and/or a sliding contact surface of the liner where the first seal ring and the liner are slidably brought into contact with each other.

34 Claims, 15 Drawing Sheets

STERN TUBE SEALING APPARATUS

FIELD OF THE INVENTION

The present invention relates to a stern tube sealing apparatus for a vessel.

Conventionally, a stern tube sealing apparatus with a seal ring made of an elastic material has been used for a vessel. However, since a draft pressure is increased in accordance with the vessel getting larger in size, a pressure applied to the seal ring is increased and many troubles that the seal ring is damaged are caused, so that a seawater enters into the vessel and a disadvantage is generated on maintaining the vessel. Accordingly, conventionally as a countermeasure therefor, it has been intended that the entering of the seawater is sealed and a durability of the seal ring is improved by supplying a pressurized air having a pressure slightly higher than the draft pressure to an aftermost annular space formed by a first seal ring and a second seal ring and always discharging the air from the annular space to the sea side.

In this case, when the air is fed out to the sea as mentioned above, a load of the first seal ring is reduced, however, the first seal ring becomes dry by the air, so that a sliding contact surface may be abraded. When the abrasion is generated in the first seal ring, a little amount of seawater enters, water is evaporated within a rearmost chamber and salt is crystallized, so that the salt is attached to the seal ring and a liner so as to be solidified, whereby there are generated disadvantages that the abrasion of both elements is promoted or that a drain line is clogged. Further, a foreign substance such as a marine growth, mud or the like attached to the first seal ring on the seawater side enters into the rearmost chamber, thereby further abrading the seal ring and the liner.

SUMMARY OF THE INVENTION

The present invention is made on the basis of the matters mentioned above, and an object of the present invention is to provide a stern tube sealing apparatus which prevents an abrasion by cooling and lubricating a sliding contact surface of a first seal ring, prevents a foreign substance and a seawater from entering so as to further improve a durability of a seal ring and a liner, intends to make the sealing apparatus compact and reduce a cost by using no pressurizing apparatus, and has a high reliability of a seal system.

In order to achieve the object mentioned above, in accordance with a first aspect of the present invention, there is provided a stern tube sealing apparatus comprising a plurality of seal rings slidably brought into contact with a liner of a propeller shaft, wherein piping communicating with one of a liquid reservoir tank and a pressure control valve connected to a liquid supply source is provided in a stern annular space defined by a first seal ring arranged on a stern side and a second seal ring adjacent to the first seal ring, and feeding means for forcibly feeding the liquid in the stern annular space to an outside of a vessel having a higher pressure than that in the stern annular space at a time of shaft rotation is provided on at least one of a sliding contact surface of the first seal ring and an opposing sliding contact surface with which the first seal ring is slidably contact.

The feeding means in this case includes all of means for feeding out a liquid from a low pressure side of the seal ring to a high pressure seawater side thereof to be sealed due to a pumping effect by a seal ring at a time of the shaft rotation (including a time of regular rotation and a time of reverse rotation of the propeller). Further, the seal ring corresponds to an idea including a lip type seal ring, a face type seal ring and a mechanical seal. In the case of the lip type seal ring, the seal ring provided with the feeding means is not required to always have a feature that the lip is directed to the seawater side, for example, it is sufficient that a contact angle with respect to the liner on the seawater side is greater than that on the vessel interior side.

When the structure is made in the manner mentioned above, it is possible to keep a pressure within the stern annular space lower than a pressure on the seawater side, it is possible to feed the liquid to the seawater side and it is possible to simultaneously cool and lubricate the sliding surface of the first seal ring, whereby it is Possible to prevent the foreign substance and the seawater from entering and the sliding load of the second seal ring with respect to the liner is reduced under a low pressure.

In this case, the feeding means for feeding the liquid from the low pressure side of the seal ring to the high pressure seawater side to be sealed is not required to be always provided on the seal ring, and when the feeding means is provided on the opposing sliding contact surface with which the first seal ring is slidably contact, the same functions and effects as those in the case that the feeding means is provided on the first seal ring can be obtained. Further, the feeding means may be provided on each of the sliding contact surfaces of the first seal ring and the opposing element. In the case of the lip type seal ring, the opposing element with which the seal ring is slidably brought into contact is a liner.

Further, in accordance with the present invention, there is provided a stern tube sealing apparatus as recited in the first aspect mentioned above, wherein a branch pipe with a pressure control valve and a flow control valve connecting to the liquid supply source is provided, via a first change-over valve, in the middle of the piping communicating with the liquid reservoir tank and the aftermost annular space, and a constant flow amount valve making it possible to flow out a constant flow amount of liquid from the stern annular space to the outside of the vessel in accordance with a change-over operation of the first change-over valve is interposed in the branch pipe.

In the case that the structure is made in the manner mentioned above, the constant flow amount valve is operated due to changing over the flow passage by means of the first change-over valve so as to flow the constant flow amount of liquid from the first seal ring to the outside of the vessel even when the feeding means does not effectively function, whereby the cooling and lubricating state of the sliding contact surface in the first seal ring can be maintained, and further it is possible to prevent the foreign substance and the seawater from entering.

Further, the first seal ring is generally arranged at the rearmost position (a position closest to the seawater), however, at least one auxiliary seal ring may be further arranged on the seawater side and the feeding means is provided in at least one of the auxiliary seal ring and an opposing element on a sliding contact surface between the auxiliary seal ring and the opposing element. In the case that the auxiliary seal ring is the lip type seal ring, the opposing element is a liner. When the structure is made in this manner, it is possible to further improve a reliability of the feeding effect.

In this case, as mentioned above, the feeding means for feeding out the liquid with a pumping action, or pump-in-action from the low pressure side of the seal ring to the seawater side corresponding to the high pressure side to be sealed is not particularly limited, however, the structure may be made such that a fine unevenness or a fine screw groove is formed on the seal ring and/or the opposing element in the seal ring and the opposing sliding contact surface. A shape of the unevenness is not limited to a circular shape, an angular shape or the like. Here, with respect to a magnitude of the "fine" evenness, the unevenness can be realized in a range of height between some microns and some hundreds microns, however, in order to achieve an effective feeding function, some tens microns is desirable. Further, a magnitude of the "fine" screw groove is set to be wide since a desirable value changes in accordance with an angle and a depth of the screw or the like, however, a width and a depth of the screw groove are set to a range between some microns and some hundreds microns. In the case of employing the former means, the fine unevenness applies a fine wedge effect to a lubricating film of the liquid at a time of the shaft rotation so as to feed out the liquid from the sliding contact surface to the seawater side. Further, in the case of employing the latter means, the fine screw groove applies a hydrodynamic effect as screw type viscoseal at a time of regular rotation of the propeller so as to feed out the liquid from the sliding contact surface to the seawater side.

Further, in accordance with a second aspect of the present invention, there is provided a stern tube sealing apparatus comprising a plurality of seal rings slidably brought into contact with a propeller shaft liner, wherein piping communicating with one of a liquid reservoir tank and a pressure control valve connected to a liquid supply source is provided in a stern annular space defined by a first seal ring arranged on a stern side and a second seal ring adjacent to the first seal ring, a rubber or polymer resin sleeve for separating into a front chamber directly connected to the piping and a rear chamber is arranged within the stern annular space, and a fine screw groove for forcibly feeding the liquid in the front chamber to the rear chamber at a time of regular rotation of a propeller is provided on a sliding contact surface of the sleeve and/or a sliding contact surface of the liner where the sleeve and the liner are slidably contact with each other.

In this case, the front chamber separated by the sleeve in the stern annular space corresponds to a section area positioned on an interior side of the vessel, and the rear chamber corresponds to a section area positioned on the seawater side.

When the structure is made in the manner mentioned above, the fine screw groove formed on the sliding contact surface of the sleeve within the stern annular space feeds out the liquid from the front chamber to the rear chamber in accordance with a hydrodynamic effect as screw type viscoseal at a time of regular rotation of the propeller, and the liquid leaks out from the rear chamber to the seawater side with passing through the sliding contact surface of the first seal ring.

The fine screw groove mentioned above is not limited to be formed on the sliding contact surface of the sleeve, and the same functions and effects as those in the case of being formed on the sleeve can be obtained even when being formed on the sliding contact surface of the liner with which the sleeve is slidably brought into contact.

Further, in accordance with the present invention, there is provided a stern tube sealing apparatus as recited in the second aspect mentioned above, wherein the structure may be made such that a branch pipe connecting to the liquid supply source is provided in the middle of the piping communicating with the liquid reservoir tank via a first change-over valve, and a constant flow amount valve making it possible to flow out a constant flow amount of liquid from the stern annular space to the outside of the vessel in accordance with a change-over operation of the first change-over valve is interposed in the branch pipe.

In the case that the structure is made in the manner mentioned above, the constant flow amount valve is operated due to changing over the flow passage by means of the first change-over valve so as to flow the constant flow amount of liquid from the front chamber to the rear chamber and further from the first seal ring to the outside of the vessel even when the hydrodynamic effect as screw type viscoseal caused by the fine screw groove formed on the sliding contact surface of the sleeve does not effectively function, whereby the cooling and lubricating state of the sliding contact surface can be maintained, and further it is possible to prevent the foreign substance and the seawater from entering.

Further, the first seal ring is generally arranged at the rearmost position (a position closest to the seawater), however, the structure may be made such that at least one auxiliary seal ring is further arranged on the seawater side of the first seal ring and the feeding means for forcibly feeding out the liquid to the outside of the vessel is provided on a sliding contact surface of the auxiliary seal ring and/or a sliding contact surface of an opposing element with which the auxiliary seal ring is slidably contacted.

Further, in the stern tube sealing apparatus in accordance with the present invention, piping connected to a ventilating line and/or a drain line communicated with an open air is provided in a second annular space adjacent to the interior side of the vessel of the stern annular space. Accordingly, in the case that a leakage is generated in the stern tube bearing lubricating oil, it is possible to recover the leaked lubricating oil within the vessel so as to prevent the lubricating oil from leaking to the outside of the vessel. Further, since a pressure of the liquid in the stern annular space is low and the second annular space is open to the air, it is possible to keep a differential pressure in the second seal ring in a small state.

Further, in accordance with the present invention, in the stern tube sealing apparatus mentioned above, the structure may be made such that a first branch pipe connecting to the liquid supply source is provided in the middle of the piping communicating with the liquid reservoir tank via a first change-over valve, a constant flow amount valve making it possible to flow out a constant flow amount of liquid from the stern annular space to the outside of the vessel in accordance with a change-over operation of the first change-over valve is interposed in the first branch pipe, a second branch pipe connecting to the air supply source is provided in the middle of the ventilating line via a second change-over valve, and an air relay to which the liquid pressure introduced by the constant flow amount valve is applied as a back pressure is interposed in the second branch pipe.

Further, in accordance with the present invention, in the stern tube sealing apparatus mentioned above, the structure may be made such that a branch pipe connecting to the liquid supply source is provided in the middle of the piping communicating with the liquid reservoir tank via a first change-over valve, a constant flow amount valve making it possible to flow out a constant flow amount of liquid from the stern annular space to the outside of the vessel in accordance with a change-over operation of the first change-over valve is interposed in the branch pipe, an oil feeding pipe connecting to the oil reservoir tank is provided in the middle of the ventilating line via a second change-over valve, and the oil reservoir tank is arranged so as to have an oil pressure lower than a feeding pressure of the constant flow amount fed to the stern annular space.

In the case that the structure is made in the manner mentioned above, it is possible to flow the constant flow amount of liquid from the first seal ring to the outside of the vessel by the constant flow amount valve even when the hydrodynamic effect as screw type viscoseal caused by the feeding means or the screw groove on the sliding contact surface of the sleeve does not effectively function, and it is possible to reduce a seal effect of the second seal ring and a contact abrasion between the second seal ring and the liner by the pressurized air or the oil fed to the second annular space.

Further, in the stern tube sealing apparatus in accordance with the present invention, the structure may be made such that an auxiliary seal ring is arranged on a further interior side of the vessel of a third seal ring arranged on an interior side of the vessel, and a branch pipe connected to an annular space defined by the third seal ring and the auxiliary seal ring from piping communicating with the stern tube chamber via a valve is provided. When the structure is made in the manner mentioned above, the auxiliary seal ring is in a standby state that a front surface pressure is the same as a back surface pressure and radial force of the seal ring itself and of a garter spring are only loaded when the valve is in an open state in the state that an oil pressure of the stern tube chamber is applied by a head pressure of the oil reservoir tank, so that it is possible to prevent an oil leakage of the stern tube chamber by closing the valve when the function of the third seal ring is damaged so as to function the auxiliary seal ring. Further, in the case that the pump is provided in the middle of a stern tube chamber circulating passage so as to circulate the oil, the auxiliary seal ring does not receive the radial force of the seal ring and the garter spring by flowing the oil from the annular space to the stern tube chamber through the auxiliary seal ring in accordance with adjustment of the valve, and it is possible to keep a further improved state as a standby state.

Further, in the stern tube sealing apparatus in accordance with the present invention, the liquid forcibly fed out to the outside of the vessel (the seawater side) may be set to a liquid which does not damage the water or seawater even when being mixed in the water or the seawater.

DESCRIPTION OF THE PREFERRED EMBODIMENT

Figure 1:
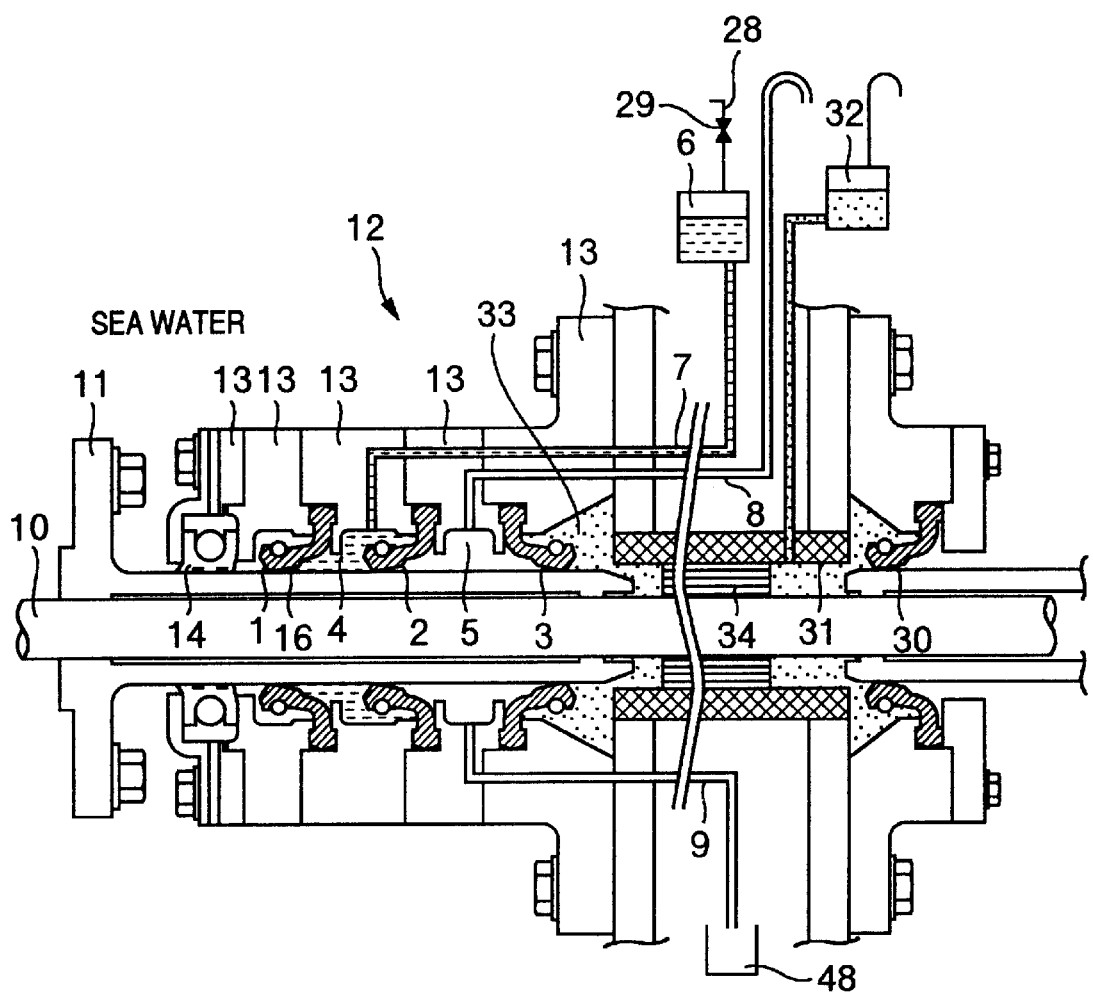
FIG. 1 is a cross sectional view which shows a representative embodiment of a stern tube sealing apparatus in accordance with the present invention.

A description will be in particular given below of embodiments in accordance with the present invention with reference to FIGS. 1 to 22. FIG. 1 is a cross sectional view which shows a representative embodiment of a stern tube sealing apparatus in accordance with the present invention. In FIG. 1, reference numerals 1, 2 and 3 denote a lip type seal ring made of an elastic material. The lip type seal rings are held by a housing member 13 of a stern tube seal 12 and are slidably brought into contact with a liner 11 of a propeller shaft 10. Each of lips of the first seal ring 1 closest to the stern side and the second seal ring 2 adjacent to the first seal ring among the seal rings is arranged to be directed to the seawater side, respectively, and a lip of the third seal ring 3 is arranged to be directed to the inside of the vessel. An aftermost annular space 4 is formed between the first seal ring 1 and the second seal ring 2, and a second annular space 5 is formed between the second seal ring 2 and the third seal ring 3. A stern tube chamber 33 communicating with an oil reservoir tank 32 is formed within a stern tube 31 between the third seal ring 3 and a fourth seal ring 30. In this case, reference numeral 14 denotes a fish net prevention ring and reference numeral 34 denotes a stern tube bearing.

The structure is made such that a water reservoir tank 6 provided within the vessel is communicated and connected with the aftermost annular space 4 via a water feeding pipe 7, whereby water is supplied. In this case, the water reservoir tank 6 is arranged so that a liquid pressure of the aftermost annular space 4 is lower than draft pressure on shaft center line. Further, a ventilating line 8 communicated with an open air and a drain line 9 for recovering leaked lubricating oil within the vessel in the case the lubricating oil leakage is generated in the stern tube bearing are connected to a second annular space 5. A supplementing line 28 and a valve 29 for supplying water when a water level within the tank is lowered are attached to the water reservoir tank 6.

Figure 2:
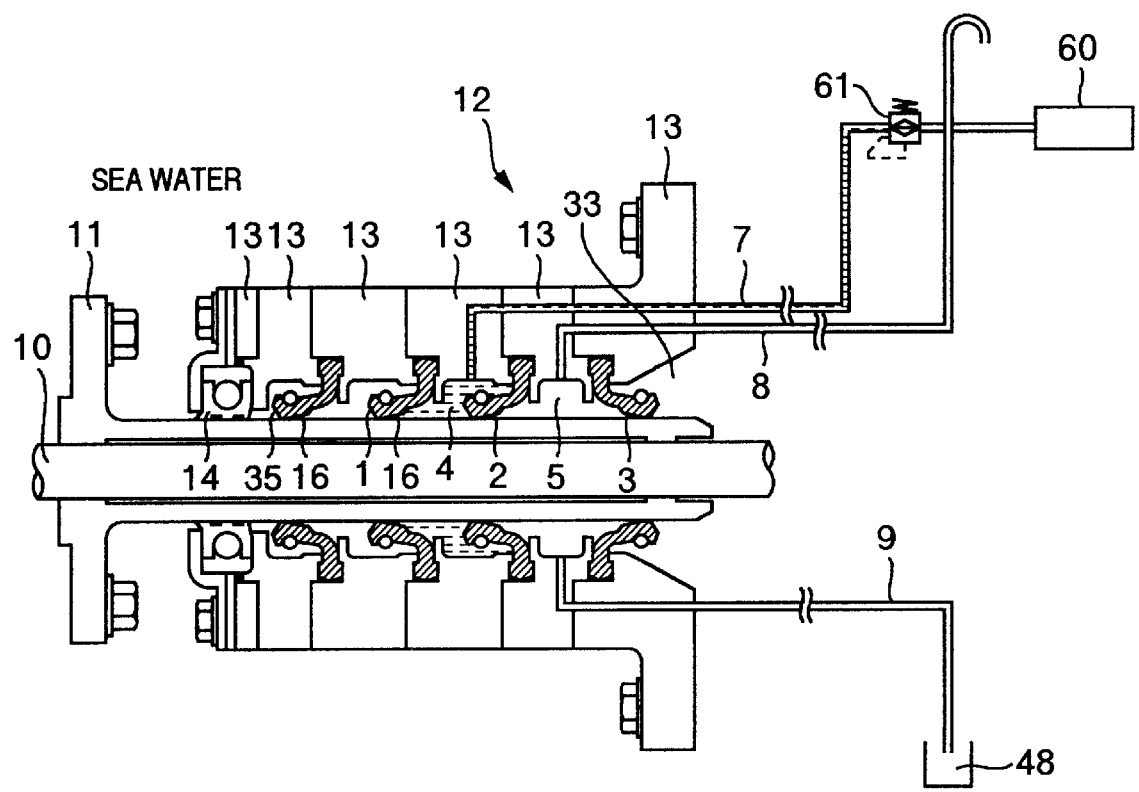
FIG. 2 is a schematic view of an embodiment in which a pressure control valve is provided in place of a water reservoir tank in the embodiment in FIG. 1.

FIG. 2 shows a structure in which the water reservoir tank 6 in the embodiment of the stern tube sealing apparatus shown in FIG. 1 is replaced by a liquid supply source 60 and a pressure control valve 61 connected thereto. In this structure, since the liquid is supplied from the liquid supply source 60, it is possible to set a pressure of the liquid in the aftermost annular space 4 lower than the draft pressure on shaft center line by adjusting the pressure control valve 61. Accordingly, in the same manner as the case that the water reservoir tank 6 is arranged, the liquid in the aftermost annular space 4 is forcibly flowed out toward the outside of the vessel in which a pressure is higher than that in the aftermost annular space 4 by the feeding means 16 provided in the first seal ring 1.

Feeding means 16 for forcibly feeding out the water in the aftermost annular space 4 to the outside of the vessel having a pressure higher than the aftermost annular space 4 at a time of rotation of the propeller shaft 10 is provided on a surface of a sliding contact area 15 with the liner 11 in the first seal ring 1.

Figure 3:
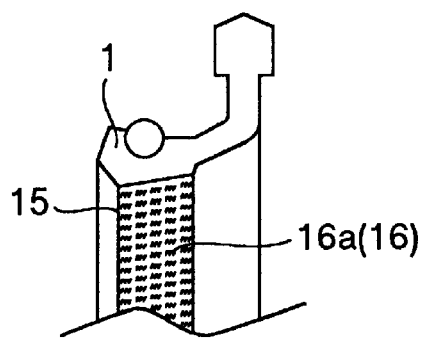
FIG. 3 is a schematic view which shows an embodiment of a lip type seal ring provided with feeding means corresponding to a main portion of the present invention.

As the feeding means 16, as shown in FIG. 3, a multiplicity of fine uneven portions 16a are provided. The fine unevenness in the uneven portions is set to a range between some microns and some hundreds microns, desirably a magnitude of some tens microns so as to apply a fine wedge effect to a lubricating film of a water stream when the propeller shaft 10 rotates, to positively generate a fluid feeding effect (backward leakage, or leakage from the back side to the front side of seal ring) in the seal ring 1 and flow out the water to the higher pressure seawater side.

Figure 4:
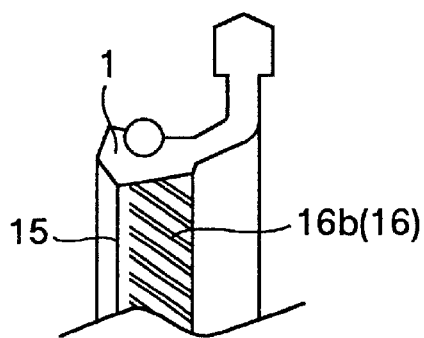
FIG. 4 is a schematic view which shows another embodiment of feeding means in correspondence to the lip type seal ring in FIG. 3.
Figure 5:
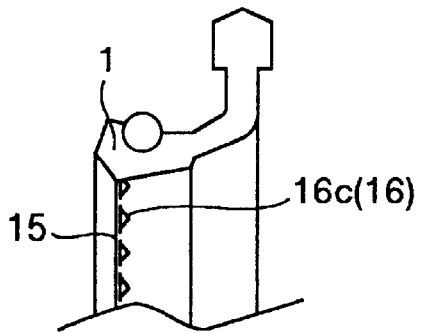
FIG. 5 is a schematic view which shows a modified embodiment of feeding means in correspondence to the lip type seal ring in FIG. 3.

The feeding means 16 is not limited to the above fine unevenness, and may be structured such that fine screw grooves 16b are provided on a first seal ring sliding contact surface 15 as shown in FIG. 4, or such that triangle grooves or triangle projections 16c are provided on the first seal ring sliding contact surface 15. Also in this case, it is possible to apply a hydrodynamic effect as screw type viscoseal or a fine wedge effect to the lubricating film of the water stream when the propeller shaft 10 rotates, to positively generate a fluid feeding effect (backward leakage) in the first seal ring 1 and to flow out the water to the outside of the vessel having the higher pressure. A magnitude (a width and a depth) of the fine screw groove is set to a range between some microns and some hundreds microns.

Figure 6:
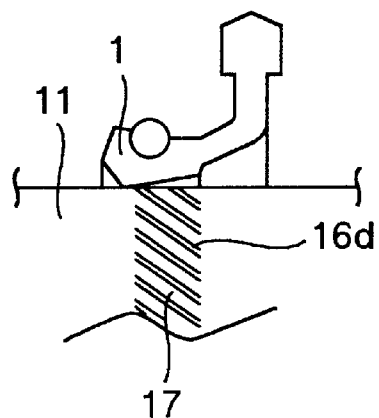
FIG. 6 is a schematic view which shows the other embodiment provided with feeding means in a liner on a lip type seal ring sliding contact surface.

The feeding means 16 may be structured such that, as shown in FIG. 6, fine screw grooves 16d are provided on a sliding contact surface 17 of the liner 11 with which the seal ring sliding contact surface 15 is slidably brought in contact, in place of the sliding contact surface 15 of the seal ring 1, so that the seal ring 1 generates the backward leakage when the propeller shaft 10 rotates, and further, it is possible to combine the fine screw grooves 16d with the screw grooves 16b provided on the seal ring sliding contact surface shown in FIG. 4.

Figure 7:
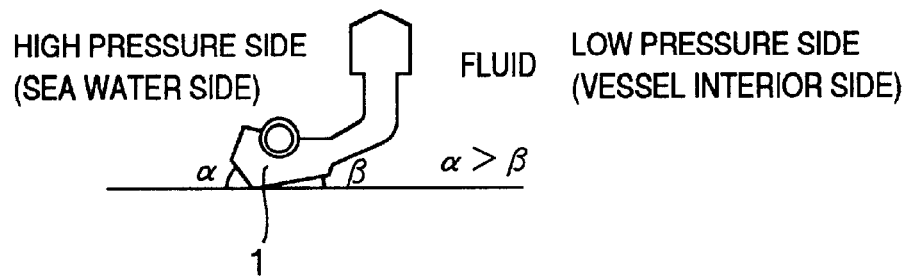
FIG. 7 is a schematic view which shows a contact angle of the lip type seal ring in the case the lip is directed to a seawater side.
Figure 8:
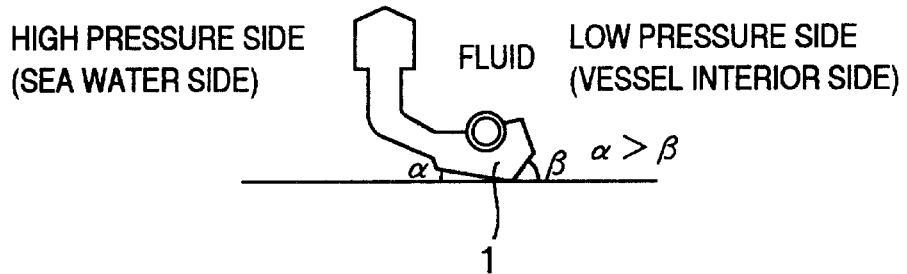
FIG. 8 is a schematic view which shows a contact angle in correspondence to FIG. 7 in the case that the lip is directed to a vessel interior side.
Figure 9:
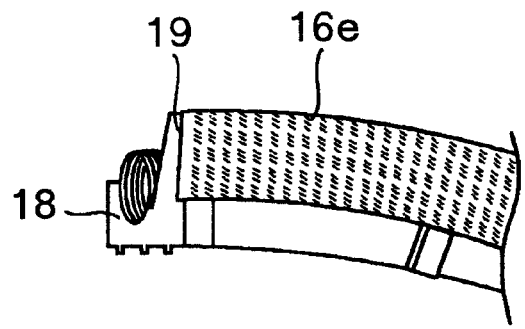
FIG. 9 is a schematic view which shows an embodiment of a face type seal ring provided with feeding means.

In the lip type seal ring with which the feeding means is provided, as shown in FIGS. 7 and 8, it is not always an essential feature that the lip is directed to the seawater side, and it is sufficient to set contact angles of the seal ring with the liner that a contact angle $\alpha$ on the seawater side is greater than a contact angle $\beta$ on the vessel interior side.

Figure 10:
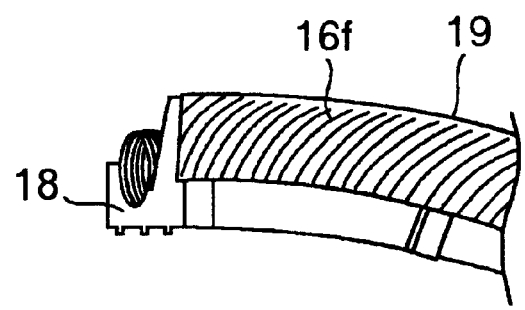
FIG. 10 is a schematic view which shows another embodiment of feeding means in correspondence to the face type seal ring in FIG. 9.
Figure 11:
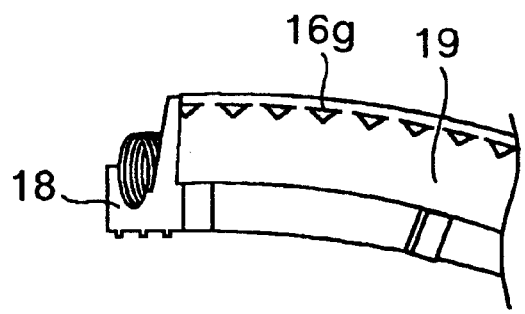
FIG. 11 is a schematic view which shows a modified embodiment of feeding means in correspondence to the face type seal ring in FIG. 9.

In the stern tube sealing apparatus shown in FIG. 1, in place of the lip type seal ring, a face type seal ring or a mechanical seal can be employed. In the case, an embodiment of feeding means shown in FIG. 9 corresponds to a structure that fine uneven portions 16e are provided on a sliding contact surface 19 of a face type seal ring 18 in place of the first seal ring 1. The fine uneven portions 16e apply a fine wedge effect to a lubricating film of a water stream when the propeller shaft 10 rotates, positively generate a fluid feeding effect (backward leakage) and flow out the water to the outside of the vessel having the higher pressure. Further, FIG. 10 shows an embodiment in which fine screw grooves 16f are provided on the sliding contact surface 19 of the face type seal ring 18 and FIG. 11 shows an embodiment in which triangle grooves 16g are formed on the sliding contact surface 19 of the face type seal ring 18, respectively. In these cases, it is possible to apply a hydrodynamic effect as screw type viscoseal to a lubricating film of a water stream when the propeller shaft 10 rotates, to positively generate a fluid feeding effect (backward leakage) in the face type seal ring and to flow out the water to the outside of the vessel having the higher pressure.

Figure 12:
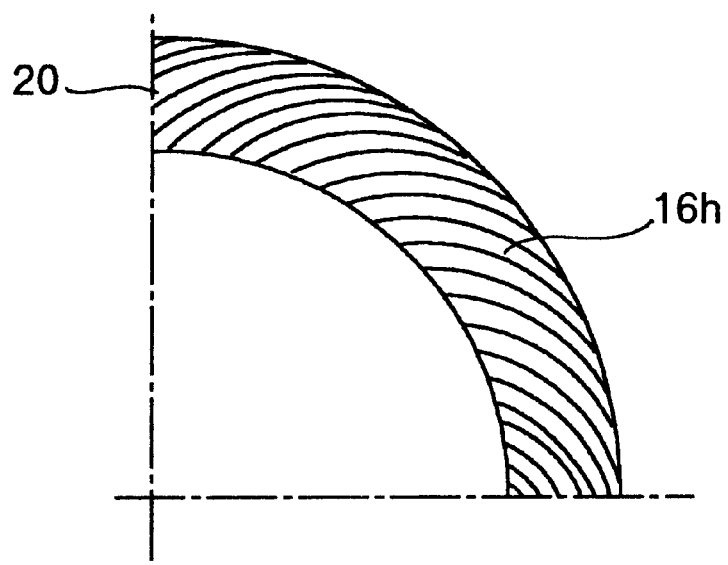
FIG. 12 is a schematic view which shows an embodiment provided with feeding means on a sliding contact surface with which the face type seal ring is slidably contact.

The feeding means 16 may be structured such that, as shown in FIG. 12, fine screw grooves 16h are provided on a sliding contact surface 20 of the opposing element with which the face type seal ring sliding contact surface 18 is slidably brought into contact in place of the sliding contact surface 19 of the face type seal ring 18 so that the face type seal ring 18 generates the backward leakage when the propeller shaft 10 regularly rotates, and further, it is possible to combine the fine screw grooves 16h with the screw grooves 16f provided on the sliding contact surface 19 of the face type seal ring 18.

Figure 13:
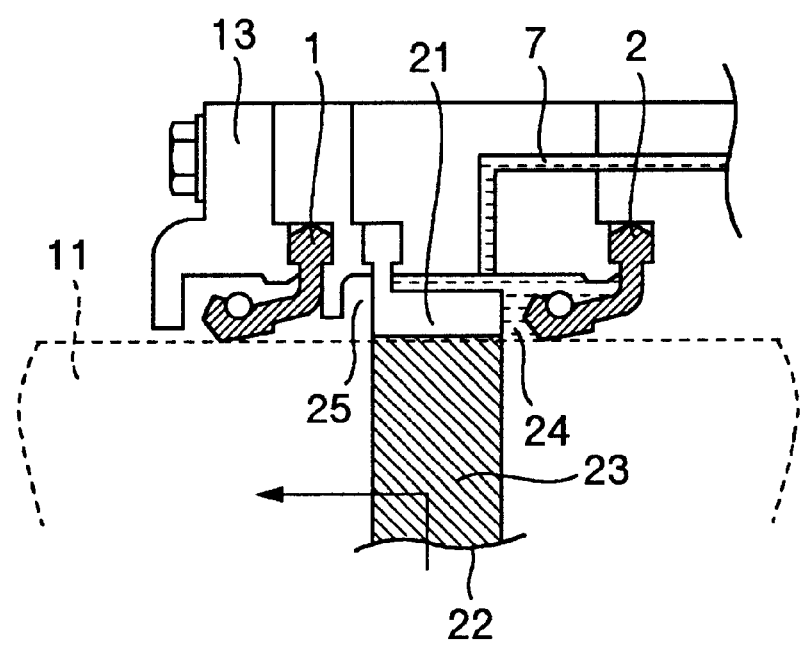
FIG. 13 is a cross sectional view which shows an embodiment provided with a screw groove in a sleeve arranged in a stern annular space.

FIG. 13 shows another embodiment. This embodiment is structured such that a rubber or polymer resin sleeve 21 held by the housing member 13 and slidably brought into contact with the liner 11 of the propeller shaft is arranged in the aftermost annular space 4 between the first seal ring 1 and the second seal ring 2, and fine screw grooves 23 applying a hydrodynamic effect as screw type viscoseal to a lubricating film of a water stream when the propeller shaft 10 regularly rotates and moving the water to the seawater side are provided on a sliding contact surface 22 in the sleeve 21 with the liner 11. That is, the aftermost annular space 4 is sectioned into a front chamber 24 on the vessel interior side and a rear chamber 25 on the seawater side by the sleeve 21, and the water fed from the water reservoir tank 6 to the front chamber 24 via the water feeding pipe 7 is forcibly fed to the rear chamber 25 at a time of regular rotation of the propeller due to the function of the screw grooves 23, and the water in the rear chamber 25 is leaked out to the seawater side through the sliding contact surface of the first seal ring 1.

Figure 14:
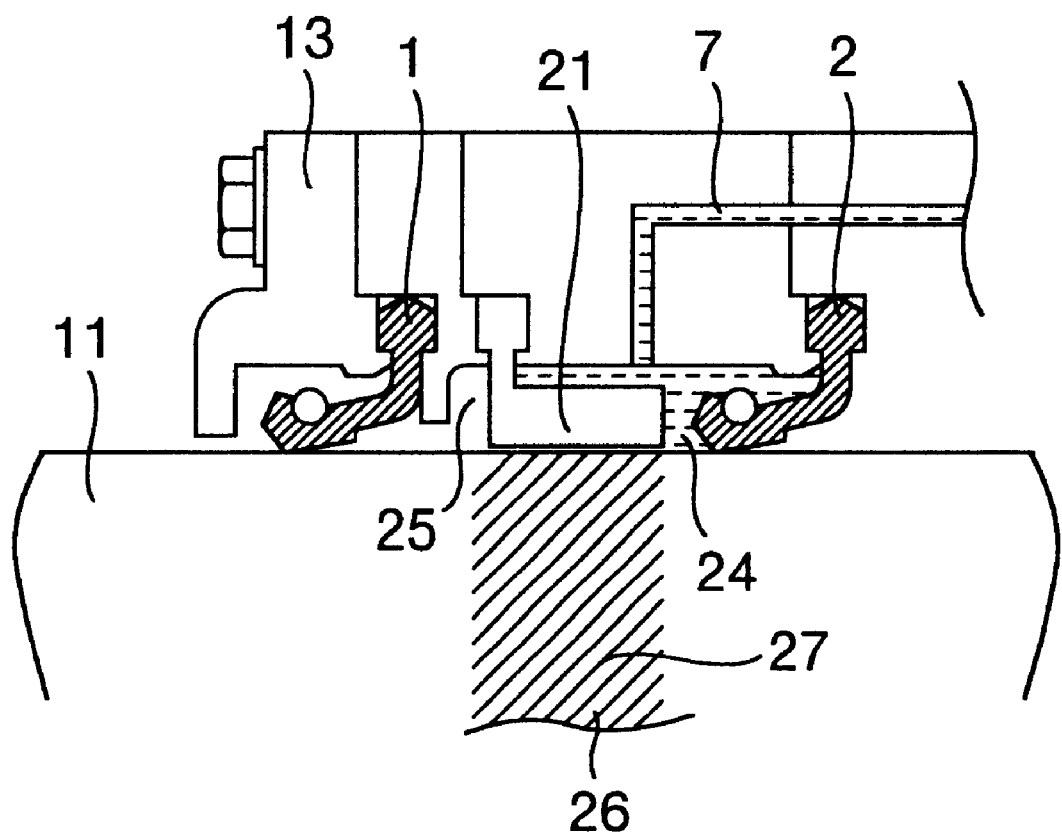
FIG. 14 is a cross sectional view which shows another embodiment provided with a screw groove on a liner surface with which the sleeve is slidably contact.
Figure 15:
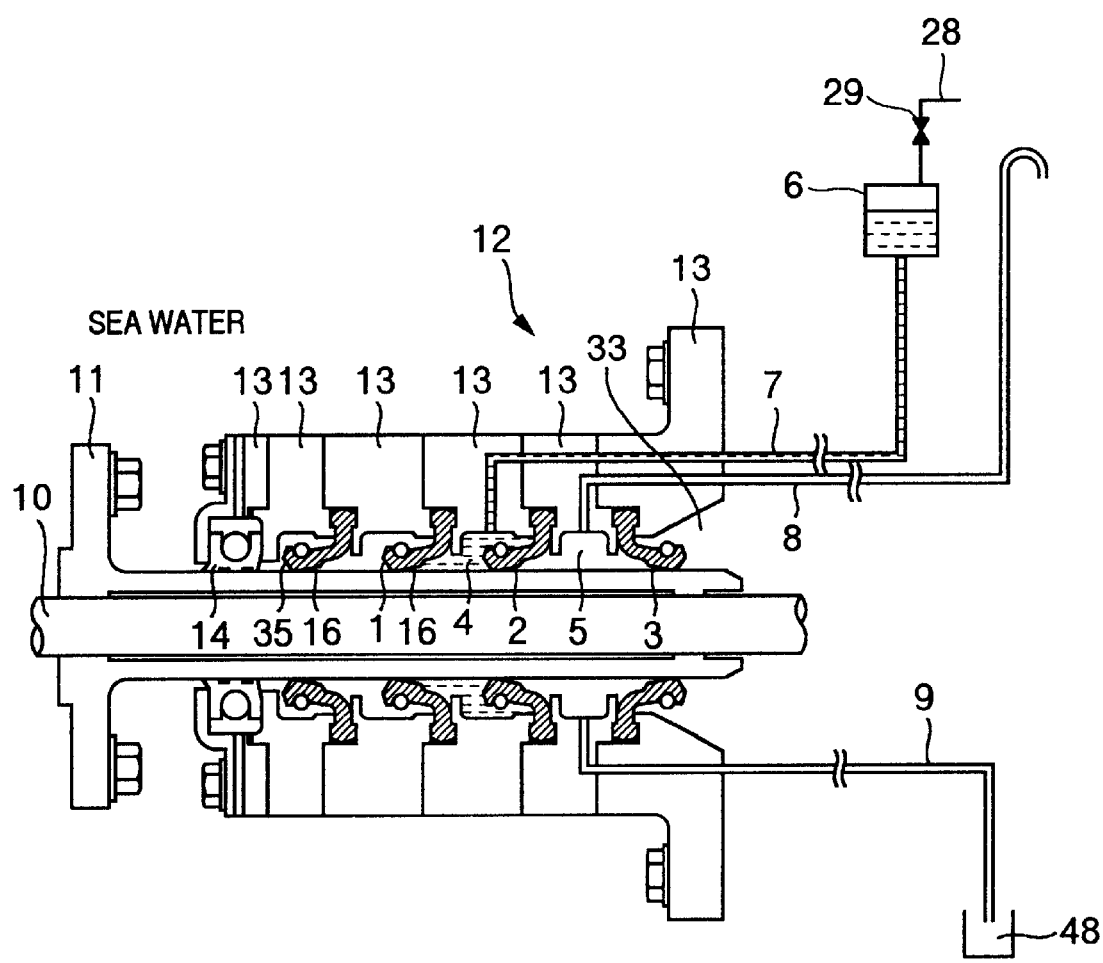
FIG. 15 is a cross sectional view corresponding to FIG. 1, which shows a modified embodiment in accordance with the present invention arranging an auxiliary seal ring provided with feeding means on a further seawater side of the first seal ring.

In place of the screw grooves 23 provided on the sliding contact surface 22 of the sleeve 21, as shown in FIG. 14, fine screw grooves 27 for moving the water to the seawater side due to the hydrodynamic effect as screw type viscoseal when the propeller 10 regularly rotates are provided on a sliding contact surface 26 of the liner 11 with which the sleeve sliding contact surface 22 is slidably brought into contact. Further, it is possible to use the fine screw grooves 27 in combination with the screw grooves 23 provided in the sleeve 21 mentioned above.

In place of the water supplied to the aftermost annular space 4 mentioned above, it is possible to use a liquid which does not damage to the seawater even when being mixed with the seawater, for example, an ethylene glycol, an alcohol or the like.

Figure 16:
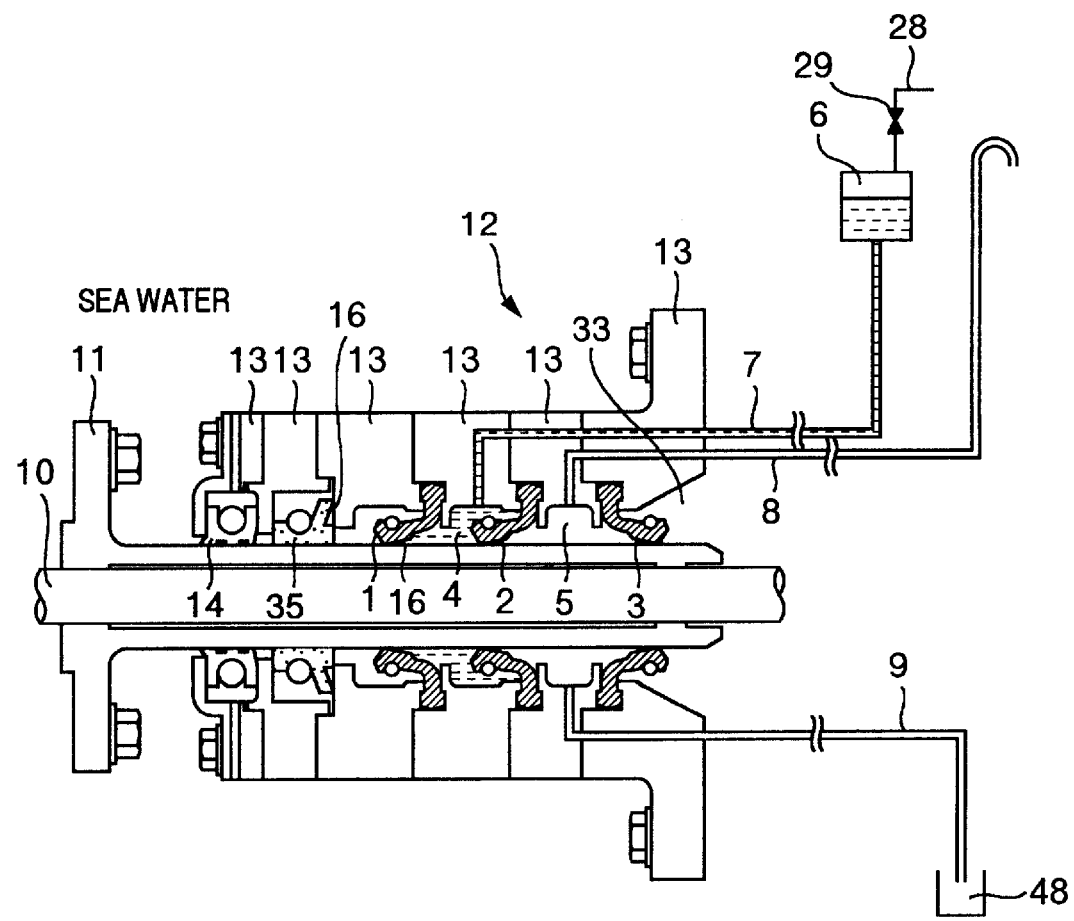
FIG. 16 is a cross sectional view which shows a modified embodiment in a state of setting an auxiliary seal ring to a face type seal ring.
Figure 17:
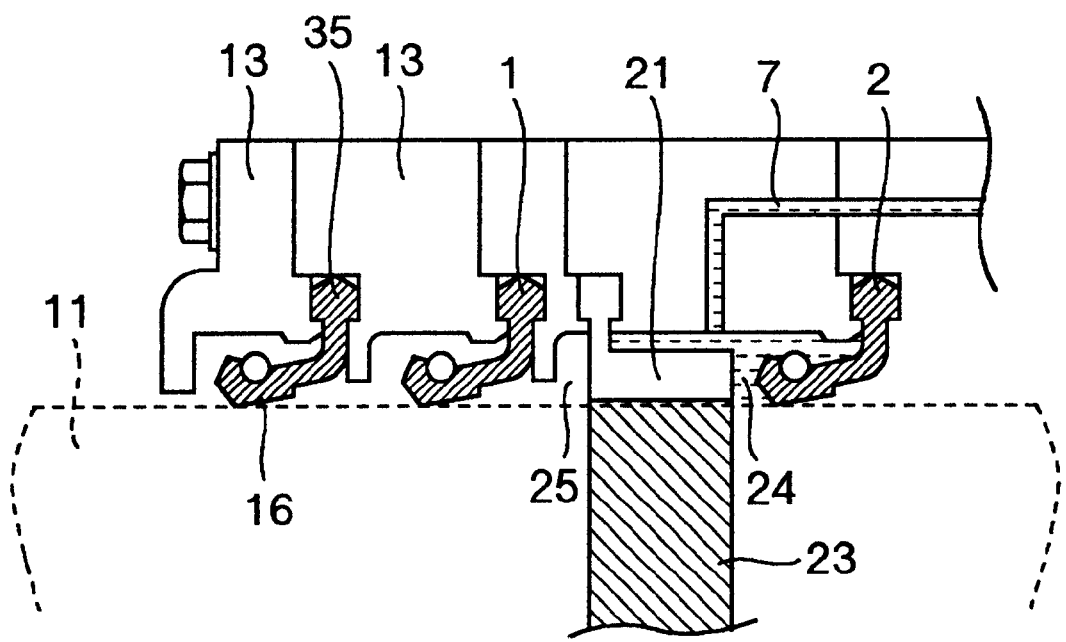
FIG. 17 is a cross sectional view corresponding to FIG. 13, FIG. 17 showing an embodiment in which an auxiliary seal ring provided with feeding means is arranged on a further seawater side of the first seal ring.

In each of the embodiments mentioned above, as shown in FIGS. 15 to 17, the structure may be made such that an auxiliary seal ring 35 is arranged on the seawater side of the first seal ring 1, and the feeding means 16 is provided on the sliding contact surface between the auxiliary seal ring 35 and the liner 11 or the sliding contact surface with the opposing element. As shown in FIG. 16, in the case that the auxiliary seal ring 35 is a face type seal ring, the mutual sliding contact surfaces are different from the case of the lip type seal ring since it is fixed to the liner 11.

Figure 18:
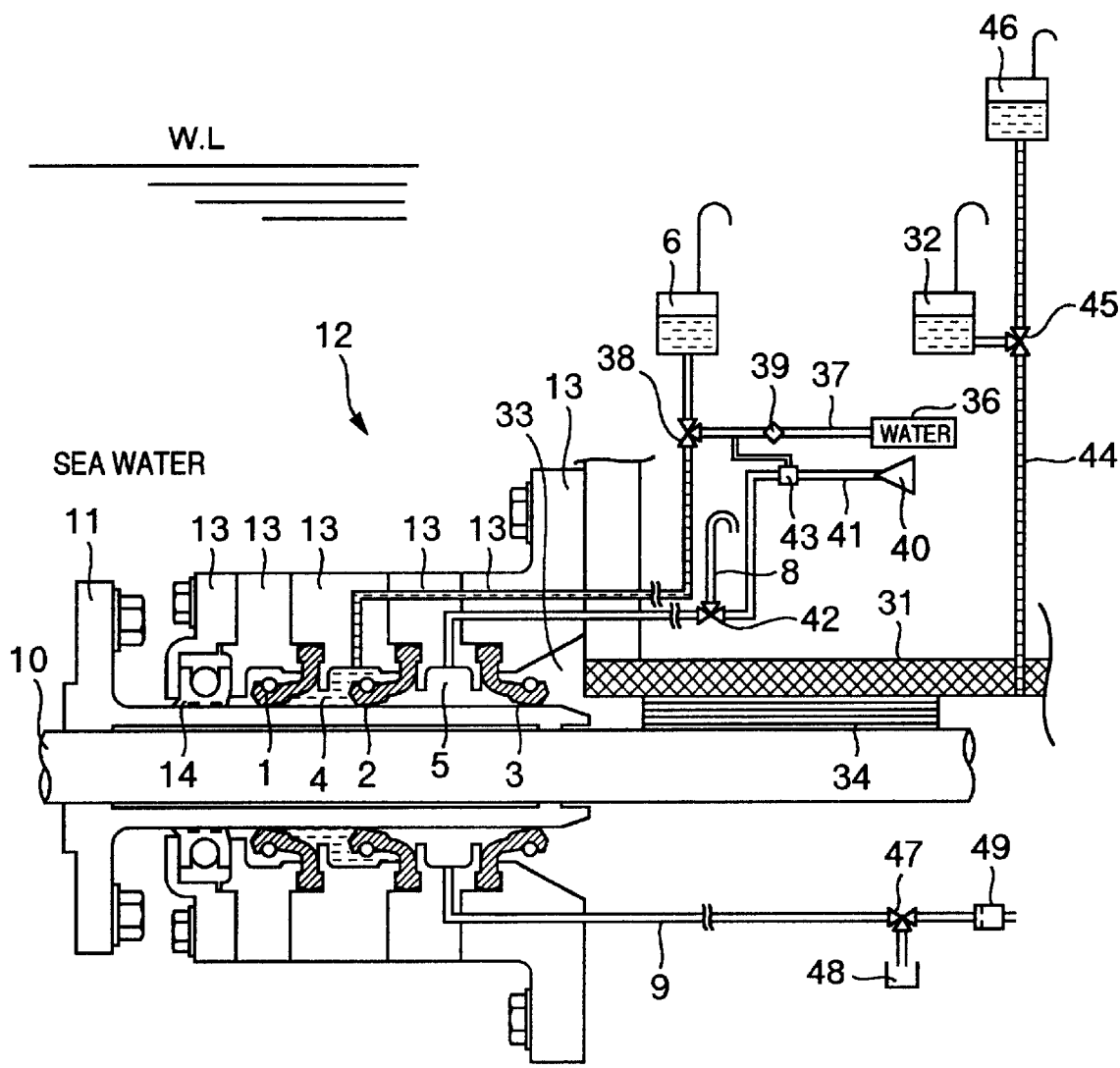
FIG. 18 is a cross sectional view which shows a structure of a stern tube sealing apparatus in accordance with the present invention provided with a safety system.
Figure 19:
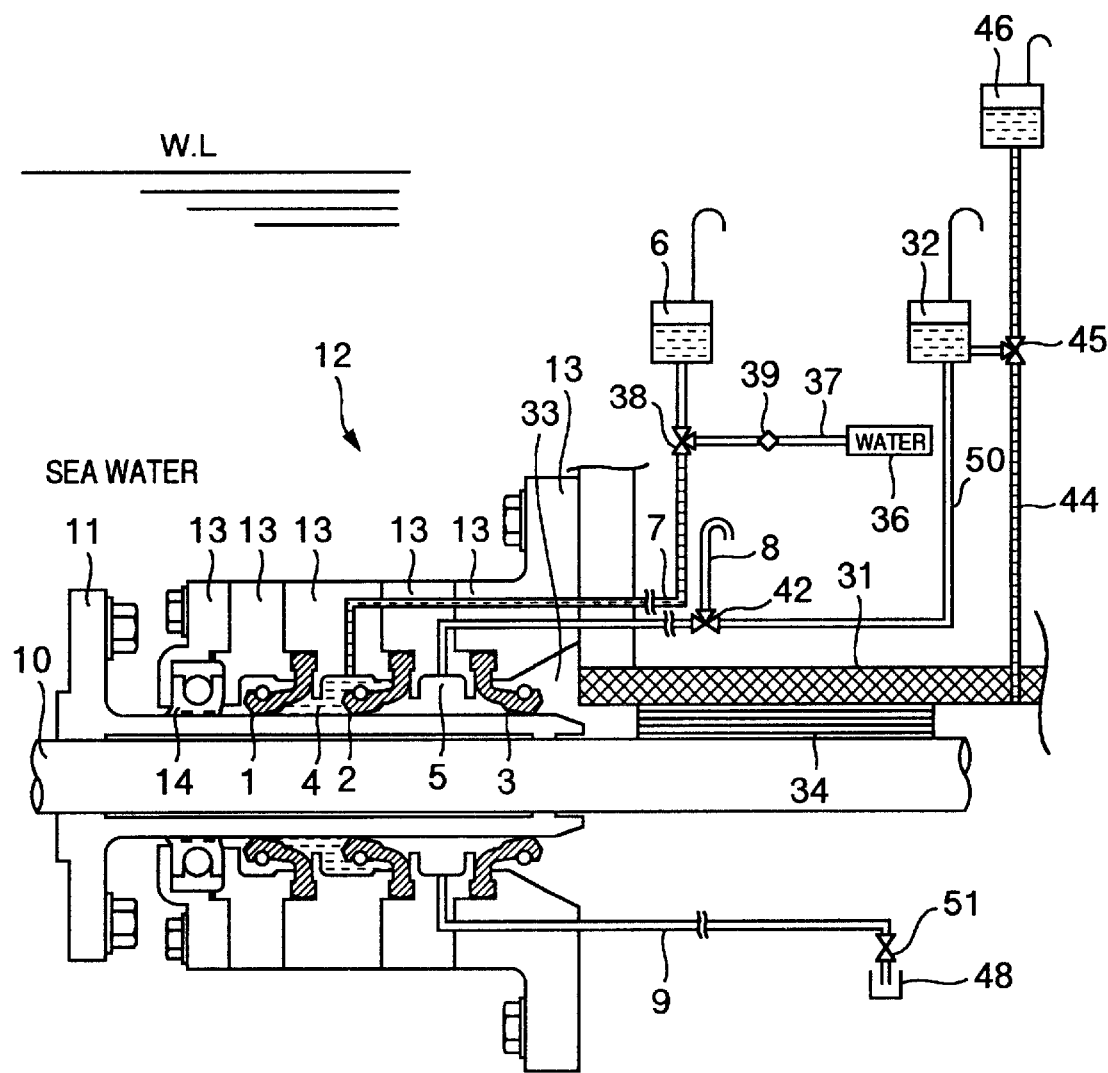
FIG. 19 is a cross sectional view which shows a modified embodiment of FIG. 18.

FIGS. 18 and 19 show a schematic structure of an embodiment of a stern tube sealing apparatus provided with a safety system which is operated when the feeding means 16 (16a to 16h) mentioned above does not effectively function.

At first, in FIG. 18, a branch pipe 37 connected to a water supply source 36 is provided in the middle of the water feeding tube 7 communicating with the water reservoir tank 6 via a first three-way valve 38, and a constant flow amount valve 39 is interposed in the middle of the branch pipe 37. The constant flow amount valve 39 is structured such as to feed a constant flow amount of water to the aftermost annular space 4 from the water supply source 36 and flow out the water from the first seal ring 1 to the outside of the vessel by changing over the flow passage to the water supply source 36 by means of the first three-way valve 38. Further, a branch pipe 41 connected to an air supply source 40 is provided in the middle of the ventilating line 8 via a second three-way valve 42, and an air relay 43 to which a water pressure introduced from the constant flow amount valve 39 is applied as a back pressure is interposed in the middle of the branch pipe 41. Accordingly, by changing over the flow passage to the air supply source 40 by means of the second three-way valve 42, the air is fed to the second annular space 5 by the air relay 43. At this time, an air feeding pressure by the air relay 43 is set to be a constant differential pressure lower than a water feeding pressure fed to the aftermost annular space 4 by the constant flow amount valve 39.

Further, when the function of the second seal ring 2 is damaged, and the water leakage to the second annular space 5 is generated to discharge the water from the drain line 9 within the vessel, the leakage from the second seal ring 2 can be prevented by making the air feeding pressure of the air relay 43 a constant differential pressure higher than the water supply pressure in addition to the constant flow amount of water supply to the aftermost annular space 4 so as to flow the air to the seawater side through the first seal ring 1 and the second seal ring 2.

Further, the oil reservoir tank 32 communicating with the stern tube chamber 33 is connected to the middle portion of the tube passage 44 via a third three-way valve 45, and a high position oil reservoir tank 46 is connected to an upper end of the tube passage 44. Accordingly, by changing over the third three-way valve 45 to the high position oil reservoir tank 46 and pressurizing the stern tube chamber 33, the air within the second annular space 5 fed by the air relay 43 is prevented from backward leakage from the third seal ring 3. A fourth three-way valve 47 is interposed in the drain line 9 connected to the second annular space 5, and the structure is made such that the flow passage can be changed over by the fourth three-way valve 47 to a drain tank 48 in one way and to an orifice 49 in another way. When feeding the air to the second annular space 5 in accordance with the operation of the air relay 43, the fourth three-way valve 47 is changed over to the orifice 49 so as to keep the pressure of the second annular space 5.

Next, in the embodiment shown in FIG. 19, differences from the embodiment shown in FIG. 18 are that in place of the air supply source for feeding the air to the second annular space 5 and the air relay, an oil feeding tube 50 connected to the oil reservoir tank 32 is provided in the middle of the ventilating line 8 via the second three-way valve 42 so as to make the pressure of the second annular space 5 pressurized by the oil reservoir tank 32 always lower than the feeding pressure of the constant flow amount fed to the aftermost annular space 4.

Then, when the feeding means 16 does not effectively function, the flow passage is changed over from the water reservoir tank 6 to the water supply source 36, the constant flow amount of water is flowed to the outside of the vessel by the constant flow amount valve 39, and the ventilating line 8 is changed over to the oil reservoir tank 32 so as to feed the oil to the second annular space and the drain valve 51 of the drain line 9 is simultaneously closed. Further, the stern tube chamber 33 is pressurized by changing over to the high position oil reservoir tank 46.

Figure 20:
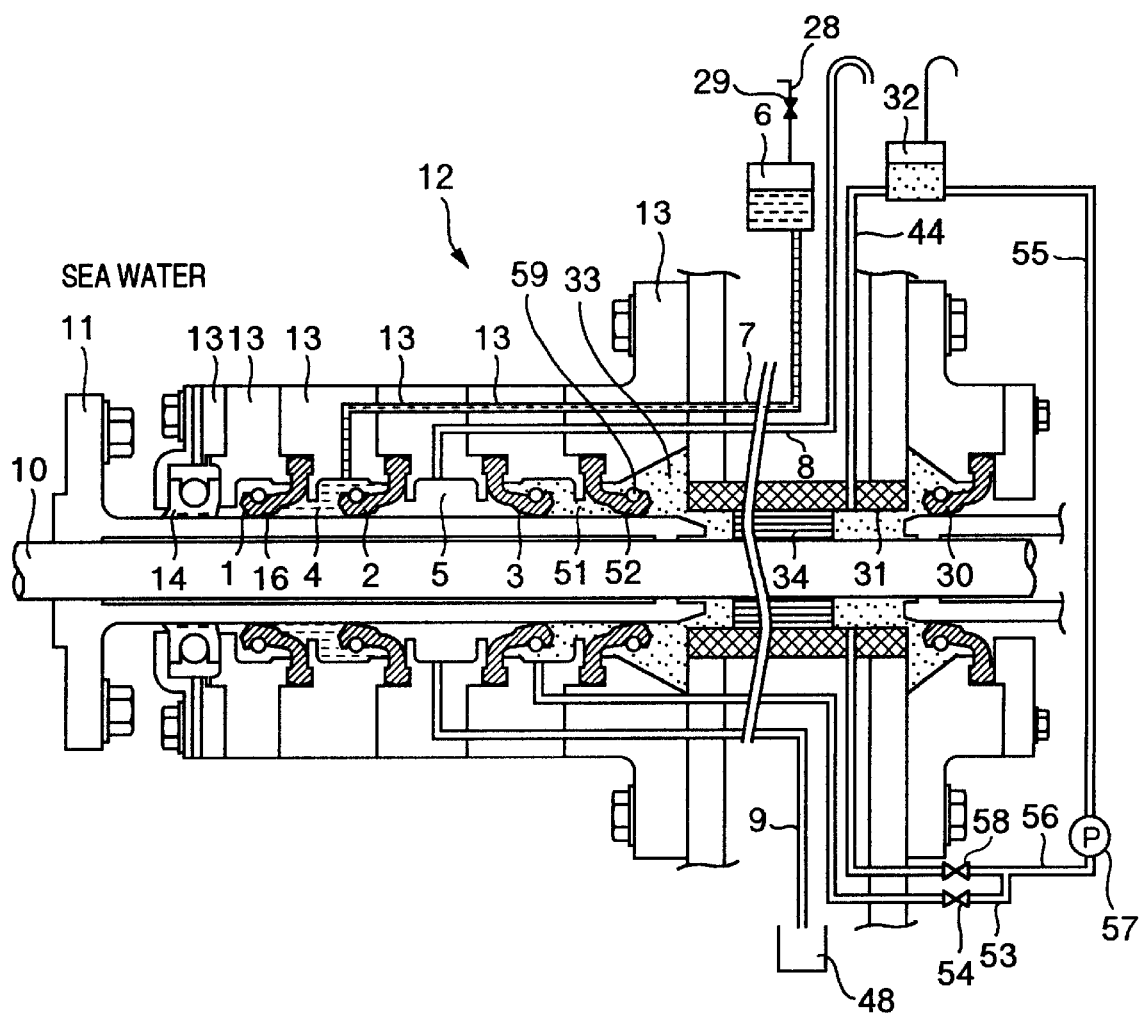
FIG. 20 is a cross sectional view which shows a stern tube sealing apparatus in accordance with the present invention provided with an auxiliary seal ring arranged on a vessel interior side of a third seal ring and a branch pipe connected via a valve from a tube passage communicating with a stern tube chamber.

Further, in the embodiment shown in FIG. 20, an auxiliary seal ring 52 is arranged on the further vessel interior side of the third seal ring 3, and a branch pipe 53 is connected via a valve 54 to an annular space 51 defined by the third seal ring 3 and the auxiliary seal ring 52 from a pipe passage 56 communicating with the stern tube chamber 33. The auxiliary seal ring 52 is set to a standby state in which the radial force of the seal ring and the garter spring is not applied by circulating the oil in the stern tube chamber 33 by a pump 57 and adjusting a valve 58 in an open state of the valve 54 so as to flow the oil to the stern tube chamber 33 from the annular space 51 through the auxiliary seal ring 53. If the third seal ring 3 is damaged, the oil leakage is prevented by closing the valve 54 and operating the auxiliary seal ring 52. Then, in the case that the oil pressure of the stern tube chamber 33 is given by the oil reservoir head pressure without providing the pump 57, the auxiliary seal ring 52 is set to a standby state in which only the load due to the radial force of the seal ring itself and the garter spring 59 is applied by keeping a front surface pressure and a back surface pressure in the auxiliary seal ring 52 in the same pressure when the valve 54 is in an open state, and if the third seal ring 3 is damaged, the oil leakage is prevented by closing the valve 54 and operating the auxiliary seal ring 52.

Figure 21:
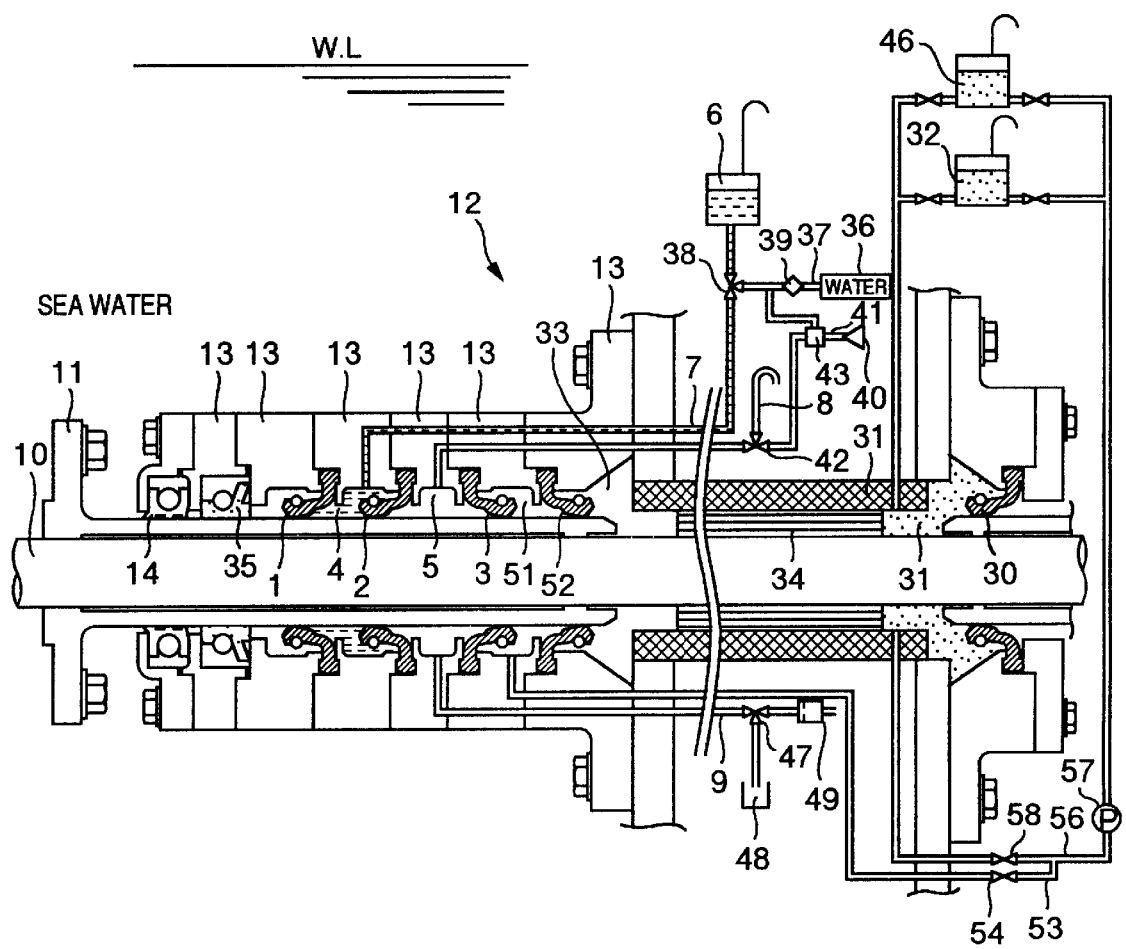
FIG. 21 is a cross sectional view showing a structure in which an auxiliary seal ring arranged on the seawater side of the first seal ring, a constant flow amount valve connected from a water feed pipe via a three-way valve and an air relay connected to a ventilating line via a three-way valve and making a water feeding pressure of the constant flow amount valve to a back pressure are further provided in the stern tube sealing apparatus shown in FIG. 20.

FIG. 21 shows a structure in which a seawater side auxiliary seal ring 35 is added to the embodiment shown in FIG. 20, the branch pipe 37 connected to the water supply source 36 is provided in the middle of the water feeding tube 7 communicating with the water reservoir tank 6 via the first three-way valve 38, and the constant flow amount valve 39 is arranged in the middle of the branch pipe 37. In the case that the feeding means of the first seal ring 1 and the auxiliary seal ring 35 do not effectively function, the water is supplied to the aftermost annular space 4 through the constant flow amount valve 39 at a constant flow amount by operating the first three-way valve 38 so as to change over the flow passage from the water reservoir tank 6 to the water supply source 36 and the water is discharged to the outside of the vessel through the first seal ring 1 and the auxiliary seal ring 35.

Further, the second branch pipe 41 connected to the air supply source 40 via the second three-way valve 42 is provided in the middle of the ventilating line 8, and the air relay 43 to which a water pressure introduced from the constant flow amount valve 39 is applied as a back pressure is interposed in the middle of the second branch pipe 41. Accordingly, by operating the second three-way valve 42 so as to change over the flow passage to the air supply source 40 from the ventilating line 8, the air is fed to the second annular space 5 from the air relay 43. At this time, the air pressure supplied to the second annular space 5 in accordance with a function of the air relay 43 is set to be a constant pressure lower than a water pressure fed to the aftermost annular space 4 by the constant flow amount valve 39.

Further, the fourth three-way valve 47 is interposed in the drain line 9 connected to the second annular space 5, and the flow passage can be changed over by operating the fourth three-way valve 47 to the drain tank 48 in one way and to the orifice 49 in another way. In the case that the feeding means of the first seal ring 1 and the auxiliary seal ring 35 do not effectively function and a constant flow amount of water is fed through the constant flow amount valve 39, in order to feed the air to the second annular space 5 in accordance with the operation of the air relay 43, the fourth three-way valve 47 is changed over to the orifice 49 so as to keep the air pressure within the second annular space 5. Since there may be a possibility that the air is leaked in a backward leakage manner to the oil side through the third seal ring 3 when feeding the air to the second annular space 5 in the manner mentioned above, it is necessary to set the oil pressure applied to the stern tube chamber 33 to be higher by employing the high position oil reservoir tank 46 in place of the oil reservoir tank 32 used at a normal time.

In this case, in order to set the oil in the stern tube chamber 33 to a proper pressure, it is possible to employ a method of pressurizing an upper portion of the oil reservoir tank 32 by the air pressure. Further, it is possible to introduce the water pressure within the water feeding tube 7 or the air pressure between the air relay 43 and the second annular space 5 within branch pipe 41 between the air relay 43 and the second annular space 5 as a back pressure of an independently provided air relay (not shown) so as to set the air pressure in the upper portion of the oil reservoir tank 32 via the air relay.

Figure 22:
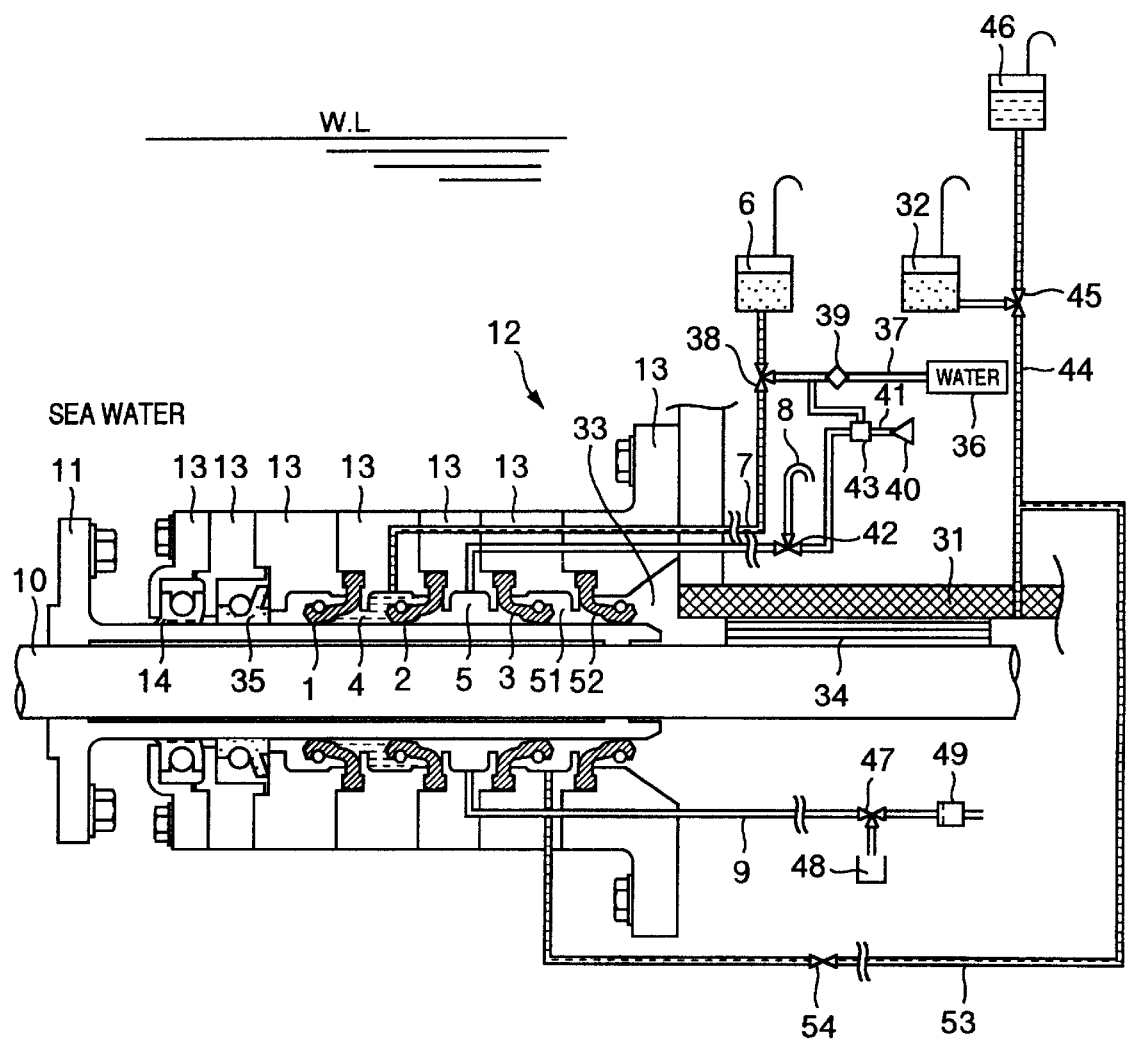
FIG. 22 is a cross sectional view which shows a structure in the case that an oil of the stern tube is not pump circulated in the stern tube sealing apparatus shown in FIG. 21.

FIG. 22 shows a structure in which the oil is not circulated in place of the structure of circulating the oil within the stern tube chamber 33 by the pump 57 described in FIG. 21. In general, the oil in the stern tube chamber 33 is pressurized by the oil reservoir tank 32. However, in the case that the feeding means of the first seal ring 1 and the auxiliary seal ring 35 do not effectively function, whereby a constant flow amount of water is supplied through the constant flow amount valve 39 and the air is supplied to the second annular space 5 in accordance with the operation of the air relay 43, the oil pressure in the stern tube chamber 33 is set by the high position oil reservoir tank 46 and the air is prevented from backward leakage to the oil side through the third seal ring 3.

In this case, in order to set the oil in the stern tube chamber 33 to a proper pressure, it is possible to employ a method of pressurizing an upper portion of the oil reservoir tank 32 by the air pressure. Further, it is possible to introduce the water pressure within the water feeding tube 7 or the air pressure within the branch pipe 41 between the air relay 43 and the second annular space 5 as a back pressure of an independently provided air relay (not shown) so as to set the air pressure in the upper portion of the oil reservoir tank 32 via the air relay.

The embodiments in FIGS. 18 to 22 can be applied even in the case that the sleeve 21 is arranged in the aftermost annular space 4 and the fine screw grooves 23 and 27 for performing the hydrodynamic effect as screw type viscoseal are provided on the sliding contact surface of the sleeve 21.

Since the stern tube sealing apparatus in accordance with the present invention is provided with the feeding means for forcibly feeding out the liquid in the stern annular space defined by the first seal ring and the second seal ring to the outside of the vessel having a higher pressure at a time of rotation of the shaft, the sliding contact surface of the first seal ring can be lubricated at the same time of being cooled, so that the abnormal abrasion and deterioration of the sliding contact surface can be prevented. Further, it is possible to prevent the foreign substance such as the marine growth, the mud or the like causing the abrasion of the seal ring, the liner and the like from entering into the stern annular space by washing out the foreign substance to the outside of the vessel with the forcibly fed-out liquid. Further, since the salt generated by invasion of a fine amount of seawater is not crystallized, it is possible to further improve a durability of the member such as the seal ring, the liner or the like with which the seal ring is slidably brought into contact as well as the foreign substance does not enter as mentioned above, and further, it is possible to prevent the drain line from being clogged.

Further, since the liquid pressure fed from the stern annular space is set to be low and the air-open piping or the drain line is provided in the second annular space adjacent thereto, the differential pressure in the second seal ring is small, and thereby, the pressurization due to the air relay and the pressurization of the stern tube lubricating oil tank are not necessary. Therefore, the sealing apparatus become compact and the cost thereof is reduced as well as the reliability of the sealing apparatus can be improved.

Further, since the second annular space is open to the atmospheric air, it is possible to independently set the pressure of the stern tube chamber to be lower than the draft pressure on shaft center line, it is possible to set the load of the fourth seal ring to be low as well as the third seal ring and it is possible to maintain the performance of the seal ring for a long time.

In addition, since the branch pipe is provided in the middle of the piping communicating with the liquid reservoir tank and the pressure control valve via the first change-over valve and the constant flow amount valve controlled by the first change-over valve is interposed in the branch pipe, it is possible to pressurize and feed the liquid to the stern annular space in accordance with the change-over operation of the flow passage by the change-over valve and it is possible to flow out the liquid to the outside of the vessel from the first seal ring even in the case that the function of forcibly flowing out the liquid to the outside of the vessel by the feeding means provided on the sliding contact surface between the seal ring and the liner or the like or the fine screw grooves provided on the sliding contact surface between the sleeve and the liner does not effectively function. Accordingly, the cooling and lubricating on the sliding contact surface of the first seal ring can be continuously secured, whereby it is possible to significantly increase the life of the member with which the seal ring is slidably brought into contact such as the seal ring, the liner and the like as well as the foreign substance and the seawater are prevented from entering. Further, since the pressurized air or the oil is fed to the adjacent second annular space due to the differential pressure with respect to the liquid pressure in the stern annular space (which is lower than the liquid pressure in the stern annular space) by changing over the flow passage, it is possible to obtain the seal effect by the second seal ring and reduce the abrasion of the member with which the second seal ring is slidably brought into contact such as the second seal ring, the liner and the like.

What is claimed is:

1. A stern tube sealing apparatus comprising a plurality of seal rings slidably brought into contact with a liner of a propeller shaft, wherein in a stern annular space defined by a first seal ring arranged on a stern side and a second seal ring adjacent to the first seal ring is provided piping communicating with one of a liquid reservoir tank arranged so that a liquid pressure within said stern annular space is lower than draft pressure on shaft center line and a pressure control valve connected to a liquid supply source, and feeding means for forcibly feeding the liquid in the stern annular space to an outside of a vessel having a pressure higher than that in the stern annular space at a time of shaft rotation is provided on at least one of a sliding contact surface of the first seal ring and an opposing sliding contact surface with which said first seal ring is slidably brought into contact.

2. A stern tube sealing apparatus as claimed in claim 1, wherein a branch pipe connecting to a liquid supply source is provided in the middle of the piping communicating with said liquid reservoir tank via a first change-over valve, and a constant flow amount valve making it possible to flow out a constant flow amount of liquid from the stern annular space to the outside of the vessel in accordance with a change-over operation of the first change-over valve is interposed in said branch pipe.

3. A stern tube sealing apparatus as claimed in claim 2, wherein at least one auxiliary seal ring is further arranged on the seawater side of the first seal ring and the feeding means for forcibly feeding out the liquid to the outside of the vessel having the higher pressure is provided in at least one of a sliding contact surface of the auxiliary seal ring and a sliding contact surface of an opposing element with which said auxiliary seal ring is slidably brought into contact.

4. A stern tube sealing apparatus as claimed in claim 3, wherein the feeding means provided on said sliding contact surface is one of fine uneven portions and fine screw grooves.

5. A stern tube sealing apparatus as claimed in claim 4, wherein piping connected to a ventilating line communicated with at least one of an open air and a drain line is provided in a second annular space formed at a position adjacent to the interior side of the vessel of said stern annular space communicating with the liquid reservoir tank.

6. A stern tube sealing apparatus as claimed in claim 5, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

7. A stern tube sealing apparatus as claimed in claim 2, wherein the feeding means provided on said sliding contact surface is one of fine uneven portions and fine screw grooves.

8. A stern tube sealing apparatus as claimed in claim 7, wherein piping connected to a ventilating line communicated with at least one of an open air and a drain line is provided in a second annular space formed at a position adjacent to the interior side of the vessel of said stern annular space communicating with the liquid reservoir tank.

9. A stern tube sealing apparatus as claimed in claim 1, wherein at least one auxiliary seal ring is further arranged on the seawater side of the first seal ring and the feeding means for forcibly feeding out the liquid to the outside of the vessel having the higher pressure is provided in at least one of a sliding contact surface of the auxiliary seal ring and a sliding contact surface of an opposing element with which said auxiliary seal ring is slidably brought into contact.

10. A stern tube sealing apparatus as claimed in claim 9, wherein the feeding means provided on said sliding contact surface is one of fine uneven portions and fine screw grooves.

11. A stern tube sealing apparatus as claimed in claim 10, wherein piping connected to a ventilating line communicated with at least one of an open air and a drain line is provided in a second annular space formed at a position adjacent to the interior side of the vessel of said stern annular space communicating with the liquid reservoir tank.

12. A stern tube sealing apparatus as claimed in claim 11, wherein a first branch pipe connecting to the liquid supply source is provided in the middle of the piping communicating with said liquid reservoir tank via a first change-over valve, a constant flow amount valve making it possible to flow out a constant flow amount of liquid from the stern annular space to the outside of the vessel in accordance with a change-over operation of the first change-over valve is interposed in said first branch pipe, a second branch pipe connecting to the air supply source is provided in the middle of the ventilating line via a second change-over valve, and an air relay to which the liquid pressure introduced by said constant flow amount valve is applied as a back pressure is interposed in said second branch tube, whereby the pressure in the second annular space is a constant differential pressure lower than the pressure in the stern annular space.

13. A stern tube sealing apparatus as claimed in claim 12, wherein an auxiliary seal ring is arranged on the interior vessel side of a third seal ring, and a third branch pipe is connected to an annular space defined by the third seal ring and the auxiliary seal ring from a pipe passage communicating with the stern tube chamber via a valve.

14. A stern tube sealing apparatus as claimed in claim 11, wherein a branch pipe connecting to the liquid supply source is provided in the middle of the piping communicating with said liquid reservoir tank via a first change-over valve, a constant flow amount valve making it possible to flow out a constant flow amount of liquid from the stern annular space to the outside of the vessel in accordance with a change-over operation of the first change-over valve is interposed in said branch pipe, an oil feeding pipe connecting to the oil reservoir tank is provided in the middle of the ventilating line via a second change-over valve, and a pressure in the second annular space set in accordance with an arrangement height of said oil reservoir tank is set to be lower than a pressure in the stern annular space fed by the constant flow amount valve.

15. A stern tube sealing apparatus as claimed in claim 14, wherein an auxiliary seal ring is arranged on the interior vessel side of a third seal ring, and a third branch pipe is connected to an annular space defined by the third seal ring and the auxiliary seal ring from a pipe passage communicating with a stem tube chamber via a valve.

16. A stern tube sealing apparatus as claimed in claim 1, wherein the feeding means provided on said sliding contact surface is one of fine uneven portions and fine screw grooves.

17. A stern tube sealing apparatus as claimed in claim 16, wherein piping connected to a ventilating line communicated with at least one of an open air and a drain line is provided in a second annular space formed at a position adjacent to the interior side of the vessel of said stern annular space communicating with the liquid reservoir tank.

18. A stern tube sealing apparatus as claimed in claim 1, wherein piping connected to a ventilating line communicated with at least one of an open air and a drain line is provided in a second annular space formed at a position adjacent to the interior side of the vessel of said stern annular space communicating with the liquid reservoir tank.

19. A stern tube sealing apparatus as claimed in claim 18, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

20. A stern tube sealing apparatus as claimed in claim 1, wherein said liquid is a liquid which does not damage the water or the seawater even when being mixed with the water or the seawater.

21. A stern tube sealing apparatus comprising a plurality of seal rings slidably contact with a liner of a propeller shaft, wherein in a stern annular space defined by a first seal ring arranged on a stern side and a second seal ring adjacent to the first seal ring is provided piping communicating with one of a liquid reservoir tank arranged so that a liquid pressure within said stern annular space is lower than a draft pressure on shaft center line and a pressure control valve connected to a liquid supply source, a rubber or polymer resin sleeve for separating into a front chamber directly connected to the piping and a rear chamber is arranged within said stern annular space, and a fine screw groove for forcibly feeding the liquid in said front chamber to the rear chamber at a time of shaft rotation is provided on at least one of a sliding contact surface of said sleeve and a sliding contact surface of said liner where said sleeve and said liner are slidably contact with each other.

22. A stern tube sealing apparatus as claimed in claim 21, wherein a branch pipe connecting to the liquid supply source is provided in the middle of the piping communicating with said liquid reservoir tank via a first change-over valve, and a constant flow amount valve making it possible to flow out a constant flow amount of liquid from the stern annular space to the outside of the vessel in accordance with a change-over operation of the first change-over valve is interposed in said branch pipe.

23. A stern tube sealing apparatus as claimed in claim 22, wherein at least one auxiliary seal ring is further arranged on the seawater side of the first seal ring and the feeding means for forcibly feeding out the liquid to the outside of the vessel is provided on at least one of a sliding contact surface of the auxiliary seal ring and a sliding contact surface of an opposing element with which said auxiliary seal ring is slidably brought into contact.

24. A stern tube sealing apparatus as claimed in claim 23, wherein piping connected to a ventilating line communicated with at least one of an open air and a drain line is provided in a second annular space formed at a position adjacent to the interior side of the vessel of said stern annular space communicating with the liquid reservoir tank.

25. A stern tube sealing apparatus as claimed in claim 24, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

26. A stern tube sealing apparatus as claimed in claim 21, wherein at least on e auxiliary seal ring is further arranged on the seawater side of the first seal ring and the feeding means for forcibly feeding out the liquid to the outside of the vessel is provided on at least one of a sliding contact surface of the auxiliary seal ring and a sliding contact surface of an opposing element with which said auxiliary seal ring is slidably brought into contact.

27. A stern tube sealing apparatus as claimed in claim 26, wherein piping connected to a ventilating line communicated with at least one of an open air and a drain line is provided in a second annular space formed at a position adjacent to the interior side of the vessel of said stern annular space communicating with the liquid reservoir tank.

28. A stern tube sealing apparatus as claimed in claim 27, wherein a first branch pipe connecting to the liquid supply source is provided in the middle of the piping communicating with said liquid reservoir tank via a first change-over valve, a constant flow amount valve making it possible to flow out a constant flow amount of liquid from the stern annular space to the outside of the vessel in accordance with a change-over operation of the first change-over valve is interposed in said first branch pipe, a second branch pipe connecting to the air supply source is provided in the middle of the ventilating line via a second change-over valve, and an air relay to which the liquid pressure introduced by said constant flow amount valve is applied as a back pressure is interposed in said second branch pipe, whereby the pressure in the second annular space is a constant differential pressure lower than the pressure in the stern annular space.

29. A stern tube sealing apparatus as claimed in claim 28, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

30. A stern tube sealing apparatus as claimed in claim 27, wherein a branch pipe connecting to the liquid supply source is provided in the middle of the piping communicating with said liquid reservoir tank via a first change-over valve, a constant flow amount valve making it possible to flow out a constant flow amount of liquid from the stern annular space to the outside of the vessel in accordance with a change-over operation of the first change-over valve is interposed in said branch pipe, an oil feeding pipe connecting to the oil reservoir tank is provided in the middle of the ventilating line via a second change-over valve, and a pressure in the second annular space set in accordance with an arrangement height of said oil reservoir tank is set to be lower than a pressure in the stern annular space fed by the constant flow amount valve.

31. A stern tube sealing apparatus as claimed in claim 30, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

32. A stern tube sealing apparatus as claimed in claim 21, wherein piping connected to a ventilating line communicated with at least one of an open air and a drain line is provided in a second annular space formed at a position adjacent to the interior side of the vessel of said stern annular space communicating with the liquid reservoir tank.

33. A stern tube sealing apparatus as claimed in claim 32, wherein an auxiliary seal ring is arranged on the interior vessel side of a third seal ring, and a third branch pipe is connected to an annular space defined by the third seal ring and the auxiliary seal ring from a pipe passage communicating with a stern tube chamber via a valve.

34. A stern tube sealing apparatus as claimed in claim 21, wherein said liquid is a liquid which does not damage the water or the seawater even when being mixed with the water or the seawater.

* * * * *